United States Patent Office 2,800,557
Patented July 23, 1957

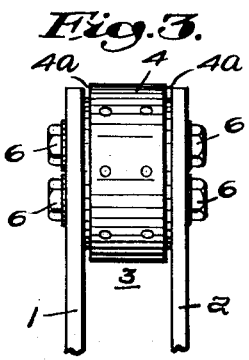
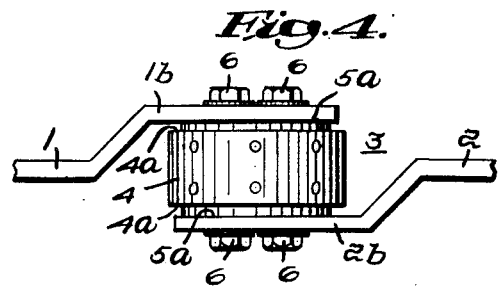
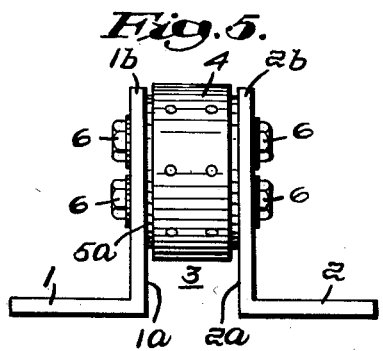
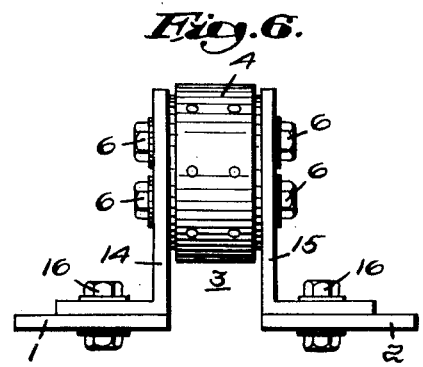
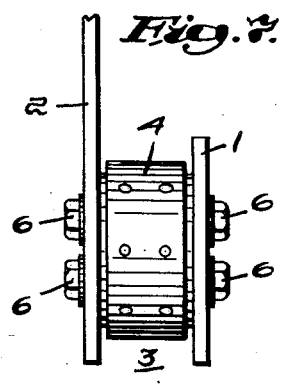
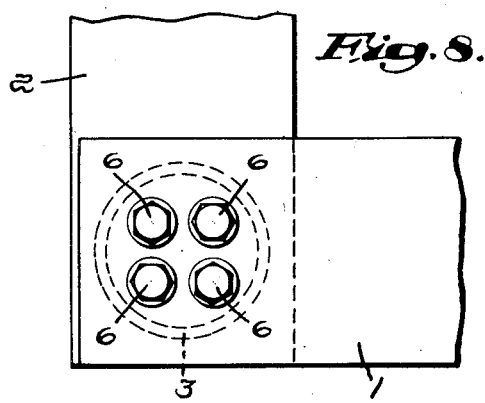

2,800,557

SECTIONALIZED BUS SYSTEMS

Kenneth W. Swain, Hampton Falls, N. H., assignor to The Chase-Shawmut Company, Newburyport, Mass.

Application December 5, 1955, Serial No. 550,977

7 Claims. (Cl. 200—133)

This invention relates to bar buses, i. e. bus systems made up of flat solid bus bars which are rectangular in cross-section.

Among other bus forms are round tubes, square tubes, channels, etc., yet flat bar buses, because of their geometric configuration, are particularly vulnerable to the destructive action of magnetic forces resulting from major fault currents. It is, therefore, one object of this invention to provide systems of bar buses capable of withstanding without damage to them the action of considerably higher short-circuit currents than prior art bar bus systems having the same mechanical strength.

The current-limiting fuse is a device enabling to effectively protect any kind of bus system against the mechanical action of major fault currents. Such fuses limit the peaks of fault currents actually occurring way below the peaks of the available fault currents, i. e. the fault currents which would flow at the point of the system where the current-limited fuse is located if a fault were produced immediately adjacent to said point by a circuit element having zero impedance. Where current-limiting fuses are provided, the peak and the duration of A.-C. fault currents are considerably reduced, thus excluding any danger to the bus system by virtue of the magnetic action of short circuit currents, excessive heat generation and magnetic resonance phenomena. Typical current-limiting fuses suitable for the protection of bus systems are disclosed in United States Patent 2,592,399 to W. S. Edsall et al., Current-Limiting Fuse, April 8, 1952, and United States Patent 2,647,970 to W. S. Edsall et al., Current-Limiting Fusible Protective Device, August 4, 1953. Though the benefits which may be derived from the application of current-limiting fuses to bus systems have been known for some time, the installation of current-limiting fuses in bus runs could only be achieved in relatively few instances. One of the main reasons accounting for the fact of relatively limited application of current-limiting fuses in bus systems are space limitations generally prevailing in bus compartments, bus ducts, or like locations. It is, therefore, another object of the invention to provide systems of bar buses which are protected by current-limiting fuses whose space requirements are minimized.

Another object of the invention is to provide systems of bar buses which are protected by current-limiting fuses stripped from such contact means as, for instance, blade contacts, and directly associated with the buses without the intermediary of separate fuse holders, or equivalent intermediate structures.

Figure 1:
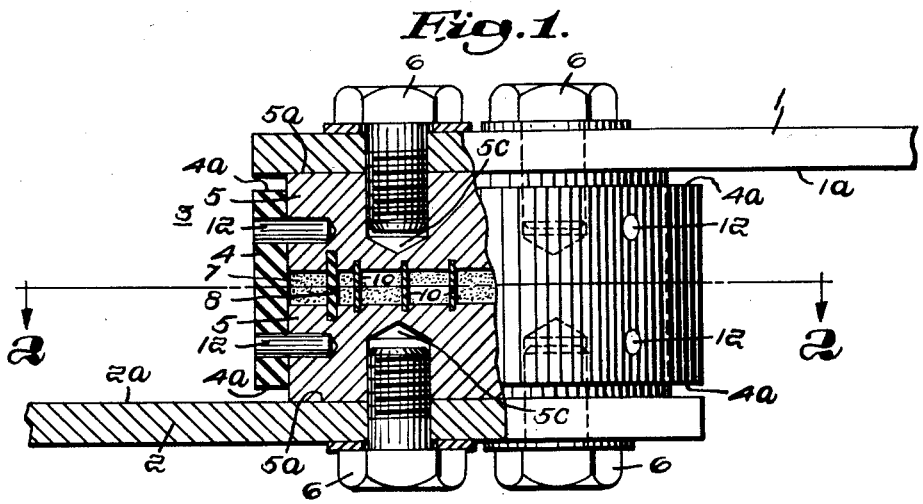
Figure 2:
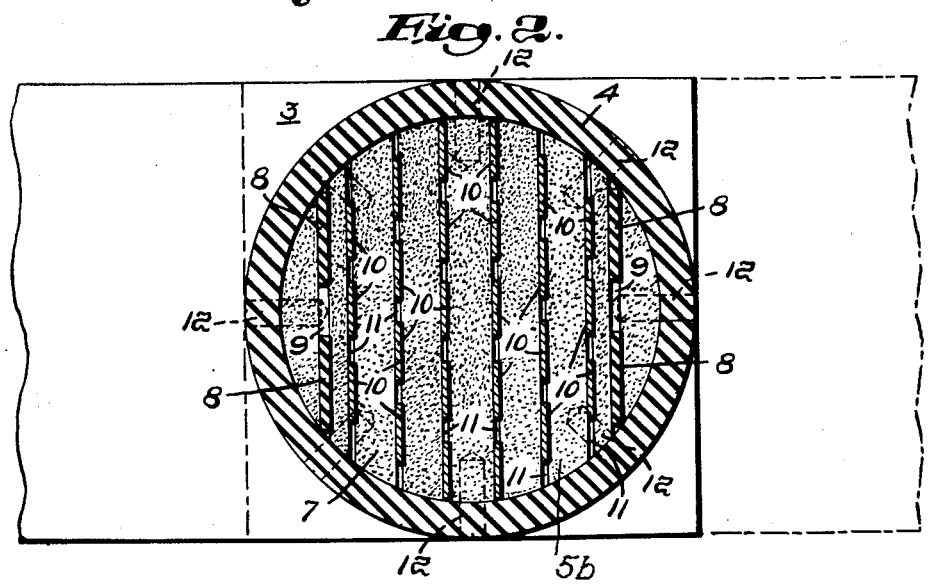

The foregoing and other general and special objects of the invention and advantages thereof will more clearly appear from the ensuing particular description of the invention, as illustrated in the accompanying drawings, wherein Fig. 1 is a sectional view, partly in elevation, of a sectionalized bus system embodying the principal features of the invention;

Fig. 2 is a section along 2—2 of Fig. 1;

Figs. 3 to 6, inclusive, are side elevations of other bus systems embodying the invention;

Fig. 7 is a side elevation of a bus system comprising a pair of bus bars which overlap at right angles, and Fig. 8 is a front elevation of the structure of Fig. 7.

Referring now to the drawing, and more particularly to Figs. 1 and 2 thereof, reference numerals 1 and 2 have been applied to a pair of spaced flat solid bar buses rectangular in cross-section. The lower surface 1a of the upper bar bus 1 and the upper surface 2a of the lower bar bus 2 are parallel. A current-limiting fuse generally indicated by reference numeral 3 is arranged between and conductively interconnects bar buses 1 and 2. Fuse 3 is made up of a casing 4 of insulating material, preferably of synthetic-resin-glass-cloth laminate closed by a pair of cylindrical terminal elements in the shape of metal plugs 5. Plugs 5 are spaced by insulating plates 8 arranged in grooves 9 provided in the axially inner base surfaces 5b of plugs 5. Ribbon-type fuse links 10 of silver arranged in similar grooves 11 in surfaces 5b conductively interconnect both plugs 5. Casing 4 and plugs 5 are joined together by a plurality of angularly displaced steel pins 12, and the space inside of casing 4 is filled with a pulverulent arc-quenching filler, preferably quartz sand. Each metal plug 5 has an outer base surface 5a projecting axially beyond the edges 4a of casing 4. The distance between base surfaces 5a and the distance between bar bus surfaces 1a and 2a are equal, and base surfaces 5a are substantially flat and adapted to form butt contacts continually carrying the rated current of fuse 3. Each base surface 5a is provided with internally screw-threaded recesses 5c adapted to receive screw-threaded bolts 6 projecting transversely across bar buses 1 and 2 and surfaces 1a, 2a. Thus fuse 3 is mounted by means of screw-threaded bolts 6 in the space between buses 1 and 2, and bolts 3 establish a relatively large amount of contact pressure between bus 1 and upper plug 5 and bus 2 and lower plug 5.

Fuses 3 operates as a brace tending to keep buses 1 and 2 properly spaced against the magnetic action of short-circuit currents tending to displace buses 1 and 2. Elimination of conventional terminal elements such as blade contacts, or the equivalent thereof, does not only considerably reduce the bulk of the structure and reduce the cost of manufacture but, in addition, tends to limit the voltage drop across the fuse 3 and thus to limit $i^2 \cdot r$ losses below prior art loss levels. It will be observed that surfaces 1a and 2a and surfaces 5a form separable butt contacts which can be separated in disconnect contact fashion when there is no current flow through buses 1 and 2 and fuse 3.

In Figs. 3 to 8, inclusive, the same numerals as in Figs. 1 and 2 have been applied to indicate like parts.

The fuse-sectionalized bus system shown in Fig. 3 differs from the system shown in Figs. 1 and 2 only inasmuch as in the former both bar buses 1, 2 extend in the same direction, whereas they extend in opposite directions in the last referred-to embodiment of the invention.

The fuse-sectionalized bus system shown in Fig. 4 comprises two bus bars 1, 2 extending in opposite directions. Bar buses 1, 2 have the same longitudinal axis or, in other words, their arrangement is coaxial. The juxtaposed ends 1b, 2b of busses 1 and 2 are bent to form a gap equal in width to the spacing of the axially outer base surfaces 5a of plugs 5 projecting beyond the edges of casing 4.

The fuse-sectionalized bus system shown in Fig. 5 comprises two bus bars 1, 2 extending in opposite directions and having juxtaposed ends 1b, 2b bent 90 degrees to form a pair of parallel contact surfaces 1a, 2a. The spacing between these surfaces 1a, 2a is equal to the spacing between the outer base surfaces 5a of plugs 5 projecting beyond the edges of casing 4.

The fuse-sectionalized system shown in Fig. 6 has generally the same geometrical configuration as that of Fig. 5, yet is more complex. In the structure of Fig. 5 fuse 3 is supported by angle members 14 and 15 bolted to bus bars 1 and 2 by means of screw-threaded bolts 16. This arrangement is not as desirable as the others since it involves additional parts and additional voltage drops, yet may be adopted where bending of the bus bars 1 and 2 at right angles is not desired.

In the structure shown in Figs. 7 and 8 the two bar buses 1, 2 are arranged at right angles in spaced relation and the fuse 3 is accommodated in the gap thus formed between the two buses. The geometrical axis of casing 4 is arranged at right angles to the planes of bus bars 1 and 2.

It will be seen from the foregoing that, by reason of the immediate physical engagement between the fuse closing plugs and bus bars, not only is the construction materially simplified and the assembly considerably facilitated but the extreme compactness of the design enables to provide current-limiting fuse protection for bar bus systems where the space limitations imposed are so severe that it was not possible heretofore to accommodate current-limiting fuses of the required current carrying capacity in the limited space adjacent the bus bars.

It will be apparent to those skilled in the art that various changes and modifications may be made in the bus system illustrated and described without departing from the spirit of the invention, as set forth in the appended claims.

I claim as my invention:

1. A sectionalized bus system comprising a first flat solid bar bus rectangular in cross-section, a second flat solid bar bus rectangular in cross-section, a pair of parallel contact surfaces one associated with said first bus and the other associated with said second bus, a current-limiting fuse conductively interconnecting said pair of contact surfaces, said fuse including a casing of insulating material closed by a pair of metal plugs each having a pair of axially outer base surfaces projecting beyond the edges of said casing, each of said pair of contact surfaces and each of said pair of base surfaces forming a pair of cooperating separable butt contacts, and screw-threaded bolts projecting transversely across said pair of contact surfaces and said pair of base surfaces into said pair of plugs pulling said pair of contact surfaces against said pair of base surfaces.

2. A sectionalized bus system comprising a first flat solid bar bus rectangular in cross-section, a second flat solid bar bus rectangular in cross-section, a current-limiting fuse having a predetermined current rating conductively interconnecting said first bus and said second bus, said fuse including a casing of insulating material closed by a pair of metal plugs having axially outer base surfaces projecting beyond the edges of said casing, said base surfaces being substantially flat adapted to form butt contacts continually carrying the rated current of said fuse and provided with internally screw-threaded recesses, said first bus and said second bus being spaced from each other and the spacing thereof being substantially equal to the spacing between said base surfaces of said plugs, and screw-threaded bolts projecting transversely across said first bus and said second bus into said screw-threaded recesses to mount said fuse in the space between said first bus and said second bus and to establish contact pressure between said base surfaces and said first bus and said second bus.

3. A sectionalized bus system comprising a first flat solid bar bus rectangular in cross-section, a second flat solid bar bus rectangular in cross-section having a portion overlapping a portion of said first bus, a current-limiting fuse conductively interconnecting said first bus and said second bus at the point where said first bus and said second bus overlap, said fuse including a casing of insulating material and a pair of metal plugs each closing one end of said casing, said casing being arranged to intersect with the geometrical axis thereof at right angles the plane of said first bus and the plane of said second bus at the point where said first bus and said second bus overlap, and screw-threaded bolts projecting transversely across said first bus and said second bus clamping said first bus and said second bus directly against said pair of plugs.

4. A sectionalized bus system comprising a first flat solid bar bus rectangular in cross-section, a second flat solid bar bus rectangular in cross-section having a portion overlapping a portion of said first bus, a current-limiting fuse having a predetermined current rating conductively interconnecting said first bus and said second bus arranged at the point where said first bus is being overlapped by said second bus, said fuse comprising a casing of insulating material closed by a pair of metal plugs projecting with the axially outer base surfaces thereof beyond the edges of said casing, said base surfaces being substantially flat adapted to form butt contacts and provided with internally screw-threaded recesses, said first and said second bus being spaced from each other a distance substantially equal to the spacing between said base surfaces of said pair of plugs, and screw-threaded bolts projecting transversely across said first bus and said second bus into said screw-threaded recesses to mount said fuse in the space between said first bus and said second bus and to establish a relatively high pressure between said base surfaces and said first bus and said second bus.

5. A sectionalized bus system comprising a pair of spaced flat solid bus bars each rectangular in cross-section, a current-limiting fuse conductively interconnecting said pair of bus bars, said fuse including a casing of insulating material closed by a pair of metal plugs having axially outer base surfaces projecting axially beyond the edges of said casing, said base surfaces forming butt contacts each in immediate physical engagement with one of said pair of bus bars and each provided with at least one internally screw-threaded recess, and screw-threaded bolts projecting transversely across said pair of bus bars into said screw-threaded recess in each of said base surfaces clamping said pair of bus bars directly against said base surfaces.

6. A sectionalized bus system comprising a first flat solid bar bus rectangular in cross-section, a second flat solid bar bus rectangular in cross-section, a current-limiting fuse having a predetermined height and including a pair of terminal elements conductively interconnecting said first bus and said second bus, said first bus and said second bus being spaced from each other and the spacing thereof being substantially equal to said predetermined height, and screw-threaded bolts projecting transversely across said first bus and said second bus to mount said fuse in the space between said first bus and said second bus and to establish contact pressure between said terminal elements and said first bus and said second bus.

7. A sectionalized bus system comprising a first flat solid bar bus rectangular in cross-section, a second flat solid bar bus rectangular in cross-section arranged in co-axial relation to said first bus, a current-limiting fuse having a predetermined height and including a pair of terminal elements, said first bus and said second bus being bent at the juxtaposed ends thereof to form a gap therebetween substantially equal to said predetermined height, and screw-threaded bolts projecting transversely across said juxtaposed bent ends of said first bus and said second bus to mount said fuse in said gap and to establish contact pressure between said terminal elements and said first bus and said second bus.

References Cited in the file of this patent

UNITED STATES PATENTS

| 810,664 | Mills | Jan. 23, 1906 |
| 2,592,399 | Edsall et al. | Apr. 8, 1952 |
| 2,647,970 | Edsall et al. | Aug. 4, 1953 |
| 2,670,418 | Kozacka | Feb. 23, 1954 |

FOREIGN PATENTS

| 17,593 | Great Britain | 1911 |